Aug. 14, 1923.

K. ENGEL

MOLDING APPARATUS

Original Filed Feb. 4, 1918

1,464,501

INVENTOR.

Patented Aug. 14, 1923.

1,464,501

UNITED STATES PATENT OFFICE.

KARL ENGEL, OF ARLINGTON, MASSACHUSETTS, ASSIGNOR TO UNITED SHOE MACHINERY CORPORATION, OF PATERSON, NEW JERSEY, A CORPORATION OF NEW JERSEY.

MOLDING APPARATUS.

Original application filed February 4, 1918, Serial No. 215,339, now Patent No. 1,281,540, dated October 15, 1918. Divided and this application filed October 14, 1918, Serial No. 257,954. Renewed November 21, 1922.

*To all whom it may concern:*

Be it known that I, KARL ENGEL, a citizen of the United States, residing at Arlington, in the county of Middlesex and State of Massachusetts, have invented certain Improvements in Molding Apparatus, of which the following description, in connection with the accompanying drawings, is a specification, like reference characters on the drawings indicating like parts in the several figures.

This invention relates to molding apparatus, and is illustrated as embodied in the lower mold of a sole-molding machine of well-known type. The present application is a division of my prior application Serial No. 215,339, filed Feb. 4, 1918 (Patent No. 1,281,540, granted Oct. 15, 1918).

It has heretofore been necessary to mold soles and attach shank stiffeners in separate operations, in order to secure accurate positioning of the stiffeners with reference to the irregular curves of the molded soles. According to the novel method claimed in my above-identified parent application, the stiffeners are attached during, and as a part of, the sole-molding operation.

An object of the present invention is to facilitate this method of operation by providing for accurately locating the shank stiffeners with respect to the soles to which they are to be attached. From this point of view the invention may be regarded as comprising a mold having a surface curved to form a sole and having means to engage a stiffener and position it accurately in predetermined relation to the curves of the molding surface. As illustrated, a member such as a locating pin carried by the mold engages the stiffener and predetermines its longitudinal position relatively to the break at the ball line of the sole, and other means such as another stiffener-engaging member is provided for predetermining its lateral position.

Other objects and features of the invention will appear from the following description when considered in connection with the accompanying drawings which illustrate a preferred embodiment of the invention and the invention will then be defined in the appended claims.

Figure 1:
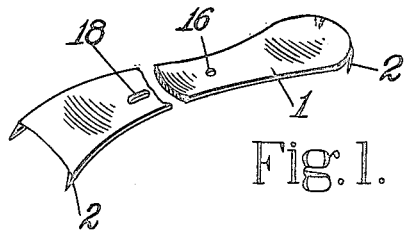
Fig. 1 is a perspective view of the shank-shaped preserving element made in accordance with the invention.
Figure 2:
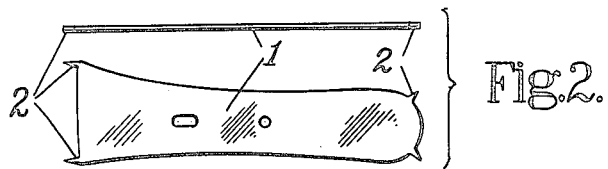
Fig. 2 illustrates in plan view and in side elevation a shank-shaped preserving element constructed in accordance with the preferred embodiment of the invention.
Figure 3:
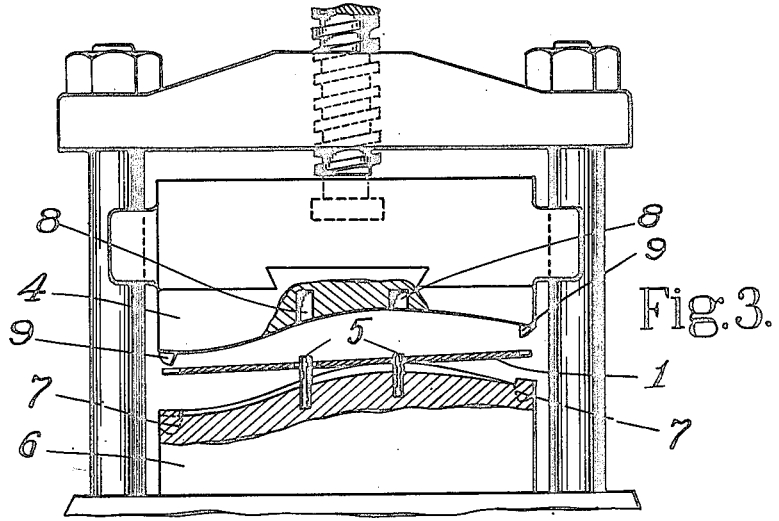
Fig. 3 is a view partly in longitudinal cross-section showing the shank-shaped preserving element assembled with the shaping molds for the operation of shaping the said element.
Figures 4, 6:
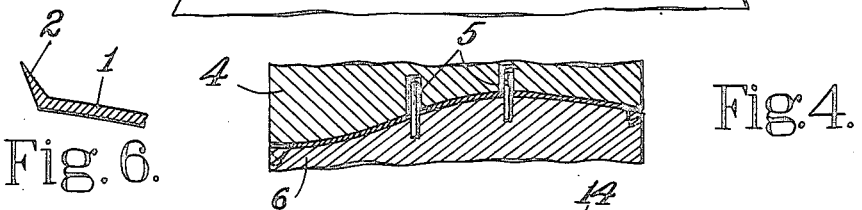
Fig. 4 illustrates in longitudinal section the operation of the shaping molds.
Fig. 6 is a detail section showing the attaching prong provided at the forward ends of the shank-shaped preserving element.

In the drawings, 1 represents the blank which is to constitute the shank-shaped preserving element. This blank is cut out from sheet metal possessing the right degree of hardness to meet the requirements of the kind of shoe to be made and to stiffen the shank portion of the quality of sole to be used. Preferably, and as herein shown, the blank is shaped generally to fit within the inseam of the shoe from the heel seat portion to substantially the "break" or ball line of the shoe. In cutting out this blank a projecting prong 2 is formed at each of the forward corners and at the rear corners of the blank and two holes 16 and 18 are also formed in the blank as shown in Figs. 1 and 2. The hole 16 is located substantially centrally on the blank at the point of the highest longitudinal curvature of the finally shaped blank while the hole 18 which is elongated is located forwardly of the hole 16 and in the median line of the blank. To enable the prongs 2 at the forward end of the blank readily to enter the sole in predetermined direction they are preferably beveled as shown in Fig. 6. The blank as thus cut out is molded to the precise shape that it is desired for the shank portion of the sole of the shoe to possess both as to longitudinal curvature or inclination and as to transverse curvature.

Also the molding operation serves to bend the prongs 2 into the desired angular relation to the body of the blank.

Conveniently the molding of the shank stiffening blank is done between co-operating dies or molds 4 and 6 which may be of any well-known construction and operated by any suitable mechanism. The bottom mold 6 is shaped to present the longitudinally and transversely curved acting surface desired for the shank-stiffening device to assume and a pair of blank-positioning pins or pilots 5 are fixed in the mold so as to project through the holes 16, 18 in the blank 1 and hold it in position in the mold, the pin 5 projecting through the hole 16 preventing the blank from moving endwise on the molding surface and the elongated slot 18 preventing lateral displacement of the shank member on the mold when pressure is applied, but allowing the blank to be curved longitudinally. The molds correspond to the shape of a finished sole, and the pins serve to position the shank-stiffening device in predetermined relation thereto to be shaped to correspond to the sole to which it is to be attached. At either corner of the molding surface prong-shaping recesses 7 are provided to receive and properly shape the projecting prongs 2 of the blank. The co-operating mold 4 presents a longitudinally and transversely curved molding surface which is complemental to that of the mold 6 and is provided with recesses 8 to receive the projecting ends of the blank-positioning pilots 5. Depending from the molding surface of the mold at each corner is a prong-bending member 9 which is suitably formed to co-operate with each of the recesses 7 to bend the prongs 2 at the forward ends of the stiffener blank to approximately 60° relatively to the body of the blank and the rear prongs to approximately 90°. The blank shown in Fig. 2 is transformed by the molds 4 and 6 into the shank-shaped preserving element shown in Fig. 1. This shape preserving element has a longitudinal and transverse curvature corresponding to the longitudinally arched conformation of the shank of the shoe and a transverse curvature corresponding to the lateral convexity desired for the shank portion of the sole. This transverse curvature of the stiffening device is of considerable practical importance inasmuch as it serves to increase the rigidity and strength of the shank, so much so in fact, that under ordinary conditions a relatively thin piece of metal may be used to constitute the stiffener. Moreover, it will be found unnecessary to temper the metal after the desired shape has been imparted to it in order for it to have the required strength and stiffness. The shank-shaped preserving element as a result of the shaping operation conforms to the molding face of the sole molding molds which are to mold a sole for the shoe in the desired manner.

Figure 5:
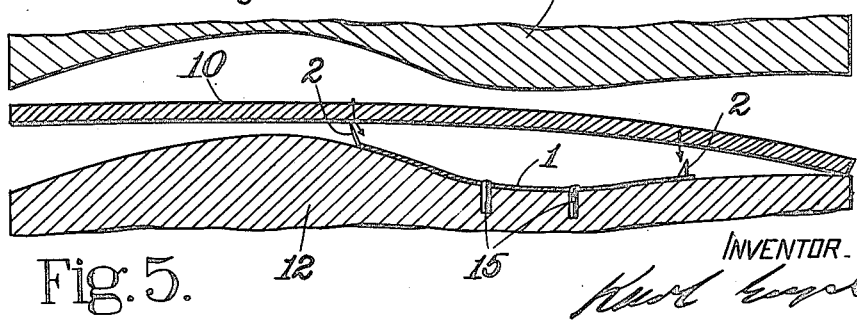
Fig. 5 is a longitudinal cross section illustrating a shoe sole and the shank-shaped preserving element of the present invention assembled for the operation of the sole-shaping molds.

In the use of the shank stiffener in accordance with the method disclosed in the above-identified application, the stiffener device 1 is placed upon an improved bottom mold 12. This mold is shaped to the longitudinal and transverse curvature of a finished sole, with a pronounced break at the ball line, and is formed with means for positioning the above-described stiffener in predetermined relation to a sole, and especially in predetermined relation to the ball line. As illustrated, pilots or locating pins 15 are provided, one of which enters hole 16 to determine the longitudinal position of the stiffener, and the other of which enters hole 18 to determine its lateral position. Thereafter, a sole 10 which has been previously died out to substantially edge contour is assembled in the sole molds in proper longitudinal and transverse position all as indicated in Fig. 5. Co-operating with mold 12 is an upper mold 14 of usual form. These sole molds 12 and 14 are operated by means well-known in the sole molding art as described in U. S. Letters Patent No. 1,004,075, granted Sept. 26, 1911, on application of Edwin K. Preble, and in the first phase of the sole molding operation the sole blank is conformed longitudinally and transversely into near parallelism with the opposed face of the stiffening device 1 and the molding surfaces of the molds 12, 14. As an incident to this phase of the sole molding operation the sole is forced upon the prongs 2 at the forward end of the stiffener which by reason of their inclination act to draw the sole rearwardly in the mold and into finally attached position on the stiffener. As the pressure continues, there being, of course, no separate stages in the application of the molding pressure, the prongs 2 at the rear of the stiffener are forced into the sole and owing to their inclination relatively to the forward prongs 2 act to impale the stiffener on the sole and prevent endwise movement of the stiffener which would tend to withdraw the forward prongs from the sole. In the final application of pressure the sole is molded to the exact shape which has been previously given to the shank-stiffening device and inasmuch as the stiffener becomes finally affixed to the sole by reason of the prongs as an incident to the molding operation the stiffener is thus enabled effectively to maintain the conformation imparted to the sole. This latter function of the stiffener is assisted to a large extent by the provision of the prongs at either of the forward corners of the stiffener since they engage the sole at either side and thus are effective in holding the sole to the transverse convexity imparted to it. It will be noted that the inclination of the prongs at the forward end of the stiffener enables them finally to enter the sole without injuring or marring the outer tread surface of the sole. Since the rear prongs are located within the area of the heel seat it is immaterial whether they project through to the tread side of the sole.

The bulkiness of the shoe in the shank is not increased by the presence of the stiffening element to any appreciable extent inasmuch as sufficient pressure is applied during the sole molding operation to embed the stiffening device in the sole, this being possible because its construction is such that maximum strength and rigidity are obtained in the stiffener with a minimum thickness of the metal plate.

Having thus described my invention, what I claim as new and desire to secure by Letters Patent of the United States is:—

1. A mold having a surface shaped transversely and longitudinally to the desired curvature of the outsole of a finished shoe, and having means to engage a shank stiffener and hold it in predetermined relation to the curvature of said surface.

2. A mold having a surface shaped to the curvature of an outsole including a pronounced break at the ball line, and having shank-stiffener positioning means including a member to engage a shank stiffener and position it longitudinally in predetermined relation to the ball line and another member to position the stiffener laterally of the mold.

3. A sole-shaping mold having means to position a shank stiffener longitudinally of the mold and means for positioning it laterally of the mold.

4. A sole-shaping mold having a locating pin to enter a hole in a shank stiffener to position it longitudinally of the mold and also having means for positioning it laterally of the mold.

5. A sole-shaping mold having a pair of locating pins to enter holes in a shank stiffener to position it in predetermined relation to the curvature of the sole-shaping face of the mold.

In testimony whereof I have signed my name to this specification.

KARL ENGEL.